(No Model.)

C. G. KLICK.
VEHICLE SHAFT SUPPORTER.

No. 545,508. Patented Sept. 3, 1895.

WITNESSES
Jos. C. Stack.
Edwin L. Bradford

INVENTOR
Charles G. Klick,
by Finckel & Finckel,
Attorneys

UNITED STATES PATENT OFFICE.

CHARLES G. KLICK, OF COLUMBUS, OHIO.

VEHICLE-SHAFT SUPPORTER.

SPECIFICATION forming part of Letters Patent No. 545,508, dated September 3, 1895.

Application filed June 27, 1895. Serial No. 554,281. (No model.)

*To all whom it may concern:*

Be it known that I, CHARLES G. KLICK, a citizen of the United States, residing at Columbus, in the county of Franklin and State of Ohio, have invented certain new and useful Improvements in Vehicle-Shaft Supporters; and I do hereby declare the following to be a full, clear, and exact description of the invention, such as will enable others skilled in the art to which it appertains to make and use the same.

The object of my invention is to provide a simple inexpensive supporter for the shafts of vehicles.

My invention consists of the novel construction and combination of parts hereinafter fully described and claimed.

Figure 1:
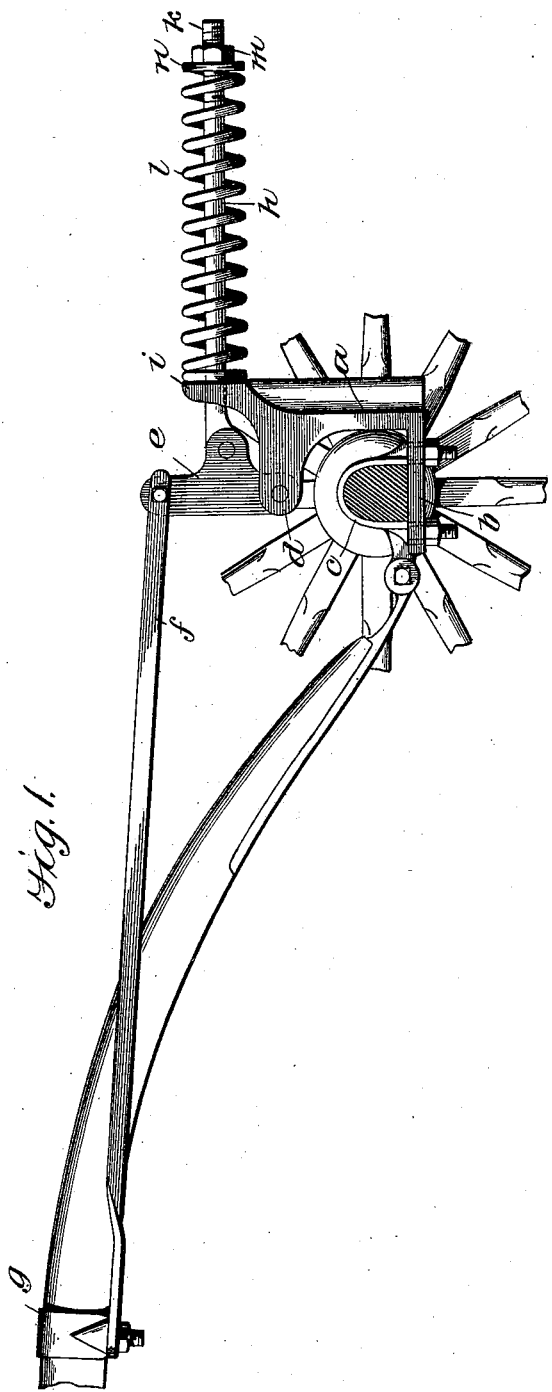
Figure 2:
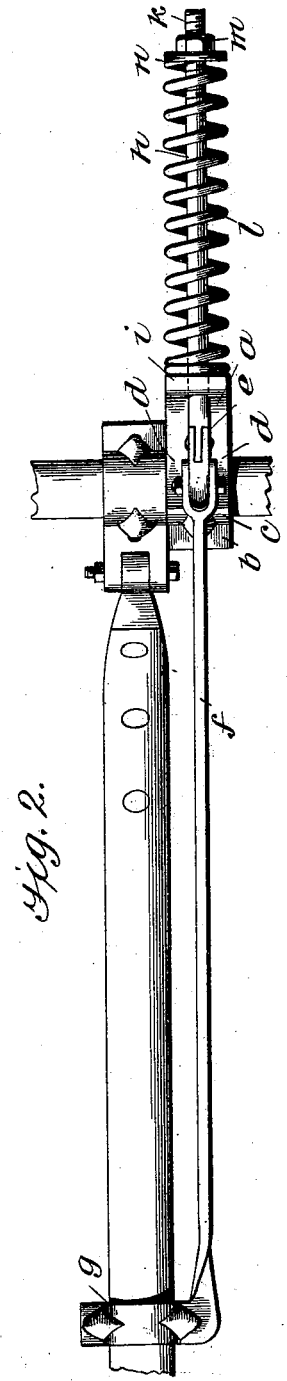

In the accompanying drawings, Figure 1 is a side elevation of my device attached to a wagon. Fig. 2 is a top plan view.

$a$ designates what may be termed a "standard," having a forwardly-projecting part $b$, which is fastened to the front axle with a clip $c$. Pivoted in suitable ears $d$ in the upper part of the standard is a lever $e$, and to the upper end of this is connected pivotally the rear end of a rod $f$, having its forward end attached to the shaft by means of a clip $g$. Pivotally connected with the rear edge of the lever $e$ is a rod $h$, which extends rearwardly through a hole in a shoulder $i$ on the upper part of the standard. The rear end of the rod $h$ is threaded, as shown at $k$. Placed upon the rod is a coiled spring $l$, the forward end of which abuts against the shoulder on the standard, while it is held on the rod by a nut and washer $m$ and $n$, respectively. The tension of the spring may be regulated by turning the nut more or less in one direction or the other. As the clip $g$ on the rod $f$ is securely fastened to the shaft, the weight of the shaft is borne elastically through the lever $e$ and rod $h$ by the coiled spring $l$, and the angle at which the shafts shall stand with respect to the wagon may be regulated by adjusting the clips upon the shafts, so relieving to any degree desired the weight of the shafts on the animal's back.

In order that one size of supporter may be adapted to vehicles having shafts and axles of different sizes or forms, the holes in the part $b$ and rod $f$, through which the bolts on the clips pass, are made elongated.

What I claim, and desire to secure by Letters Patent, is—

A vehicle shaft supporter comprising a standard $a$, with means for attaching it to the axle, a lever $e$ pivoted thereto, a rod $f$ with means for attaching the same to the shaft, a rod $h$ on the lever $e$ and a coiled spring secured on the rod $h$ against the standard, substantially as described.

In testimony whereof I affix my signature in presence of two witnesses.

CHARLES G. KLICK.

Witnesses:
GEORGE M. FINCKEL,
JAMES WILLIAMSON.